United States Patent
Campau

(10) Patent No.: US 6,834,888 B2
(45) Date of Patent: Dec. 28, 2004

(54) CONNECTOR

(75) Inventor: Daniel N. Campau, Ada, MI (US)

(73) Assignee: Flow-Rite Controls, Ltd., Grand Rapids, MI (US)

( * ) Notice: Subject to any disclaimer, the term of this patent is extended or adjusted under 35 U.S.C. 154(b) by 0 days.

(21) Appl. No.: 10/358,000

(22) Filed: Feb. 4, 2003

(65) Prior Publication Data

US 2004/0150223 A1 Aug. 5, 2004

(51) Int. Cl.[7] .............................................. F16L 37/08
(52) U.S. Cl. .......................... 285/81; 285/320; 285/85
(58) Field of Search .............................. 285/81, 84, 85, 285/320, 87; 439/352, 347

(56) References Cited

U.S. PATENT DOCUMENTS

| | | | |
|---|---|---|---|
| 2,784,987 A | * | 3/1957 | Corcoran ...................... 285/82 |
| 3,628,812 A | * | 12/1971 | Larralde et al. .............. 285/24 |
| 3,885,851 A | * | 5/1975 | Bennett ....................... 439/352 |
| 4,373,753 A | * | 2/1983 | Ayers et al. ................. 285/319 |
| 4,500,117 A | * | 2/1985 | Ayers et al. .................... 285/3 |
| 4,787,859 A | * | 11/1988 | Heller ........................ 439/352 |
| 4,902,045 A | * | 2/1990 | McGugan et al. ............. 285/24 |
| 4,966,398 A | * | 10/1990 | Peterson ..................... 285/319 |
| 5,074,803 A | * | 12/1991 | Chandler et al. ........... 439/347 |
| 5,324,081 A | * | 6/1994 | Umezawa .................... 285/86 |
| 5,366,259 A | * | 11/1994 | Hohmann et al. .......... 285/305 |
| 5,489,125 A | * | 2/1996 | Hohmann ..................... 285/81 |
| 5,868,524 A | * | 2/1999 | Martin ....................... 405/170 |
| 5,897,142 A | * | 4/1999 | Kulevsky .................... 285/308 |
| 6,155,607 A | * | 12/2000 | Hewitt et al. ................. 285/81 |
| 6,257,626 B1 | * | 7/2001 | Campau ....................... 285/81 |
| 6,283,443 B1 | * | 9/2001 | Taneya .................... 251/149.6 |
| 6,443,496 B2 | * | 9/2002 | Campau ....................... 285/81 |

FOREIGN PATENT DOCUMENTS

| | | |
|---|---|---|
| EP | 0340194 A1 | 11/1989 |
| EP | 1048884 A2 | 11/2000 |
| FR | 2782773 A1 | 2/1998 |
| WO | WO98/00663 | 1/1998 |

OTHER PUBLICATIONS

European Search Report of EP 04394005.5 dated Jun. 3, 2004.

* cited by examiner

Primary Examiner—Eric K. Nicholson
(74) Attorney, Agent, or Firm—Niro, Scavone, Haller & Niro

(57) ABSTRACT

The present invention is directed to a connector, comprising a first connector segment having a laterally extending flange, and a second connector segment having a body and a pair of opposed retainers adapted to releaseably maintain the first and second connector segments in mated relationship. Each of the retainers has a lever spaced laterally from the second connector segment body, the lever being joined to the second connector segment body at a base end and having a latch at a free end. The lever is also joined to the second connector segment body by a fulcrum wall positioned intermediate the ends of the lever, an outwardly facing cam surface is provided on the lever between the fulcrum wall and the base end. A slide ring is disposed over the second connector segment retainers, the slide ring being moveable from a first position adjacent the latch of each retainer to a second position of engagement with the cam surface of each retainer. The latch of each retainer is engageable with the flange of the first connector segment to prevent uncoupling of the first and second connector segments.

The latches of each retainer are locked in engagement with the first connector segment flange when the slide ring is in the first position, and the latches of each retainer are disengaged from the first connector segment flange to thereby permit uncoupling of the connector segments when the slide ring is in the second position.

4 Claims, 3 Drawing Sheets

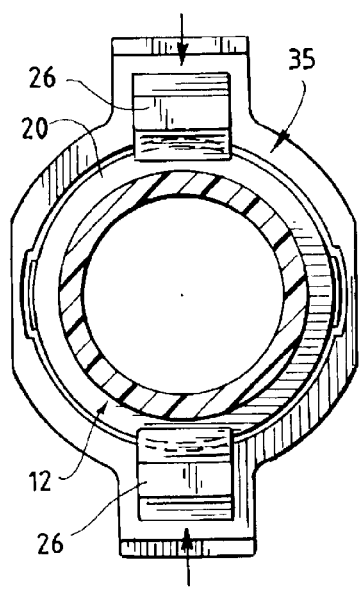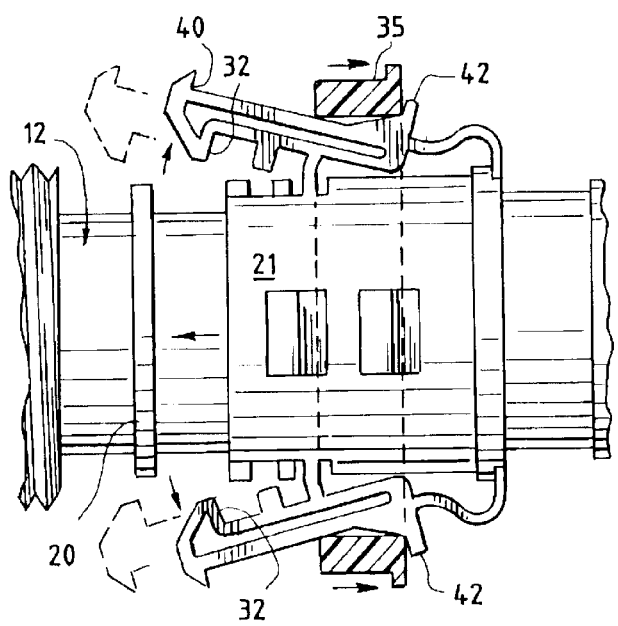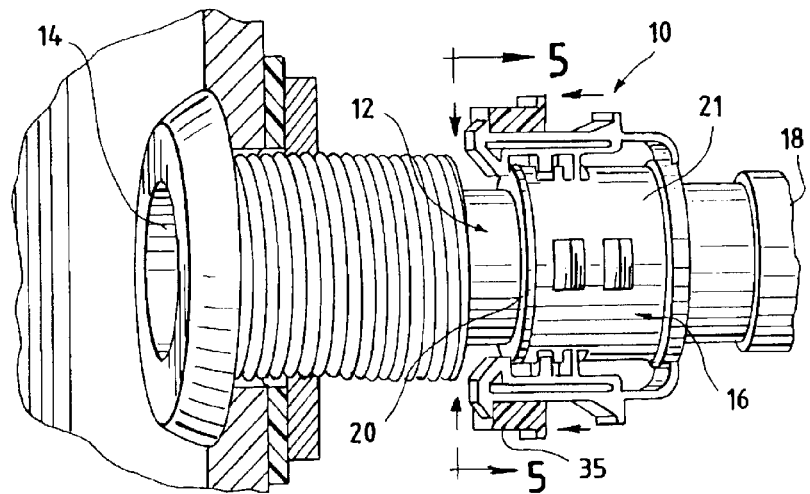

CONNECTOR

BACKGROUND OF THE INVENTION

The present invention is directed to "quick coupling" connectors and, more particularly, to improvements in the quick coupling connector disclosed in U.S. Pat. No. 6,257,626.

The connector described in U.S. Pat. No. 6,257,626 has many advantageous features and has proved useful in the marine fluid handling field. Such a connector must be manually manipulated to effect connection and disconnections. One disadvantage of the aforementioned connector, however, is that at least two separate manual operations are required to effectively lock or unlock the connector. That is, both the lock ring and the retainers must be manipulated separately to couple or decouple the connector. It would be desirable, therefore, to retain the advantages of this style connector while simplifying and facilitating its use.

SUMMARY OF THE INVENTION

The present invention is directed to a connector, comprising a first connector segment having a laterally extending flange, and a second connector segment having a body and a pair of opposed retainers adapted to releaseably maintain the first and second connector segments in mated relationship. Each of the retainers has a lever spaced laterally from the second connector segment body, the lever being joined to the second connector segment body at a base end and having a latch at a free end. The lever is also joined to the second connector segment body by a fulcrum wall positioned intermediate the ends of the lever an outwardly facing cam surface is provided on the lever between the fulcrum wall and the base end. A slide ring is disposed over the second connector segment retainers, the slide ring being moveable from a first position adjacent the latch of each retainer to a second position of engagement with the cam surface of each retainer. The latch of each retainer is engageable with the flange of the first connector segment to prevent uncoupling of the first and second connector segments.

The latches of each retainer are locked in engagement with the first connector segment flange when the slide ring is in the first position, and the latches of each retainer are disengaged from the first connector segment flange to thereby permit uncoupling of the connector segments when the slide ring is in the second position.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 3 is a side view, again in partial cross-section, showing the two connector components or segments as they are engaged;

FIG. 4 is a perspective view of the two connector segments in fully mated and locked engagement;

FIG. 5 is a cross-sectional view taken along line 5—5 of FIG. 4; and

DETAILED DESCRIPTION OF THE PREFERRED EMBODIMENTS

Figure 1:
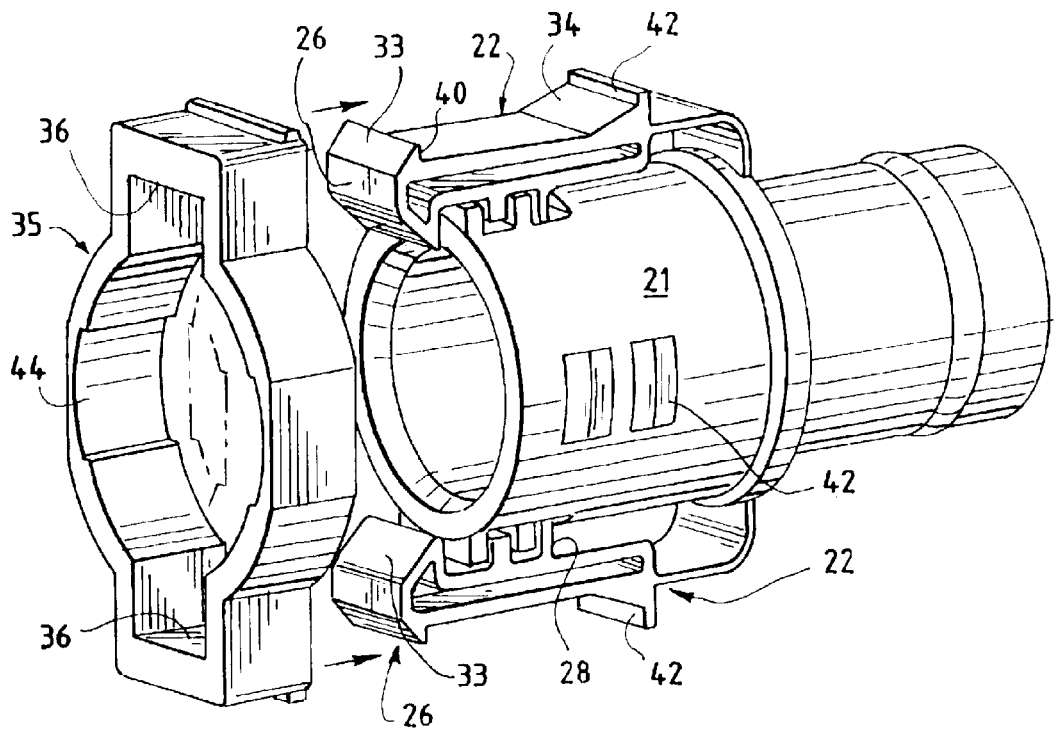
FIG. 1 is an exploded perspective view of one connector component or segment as used in accordance with a preferred embodiment of the invention.
Figure 2:
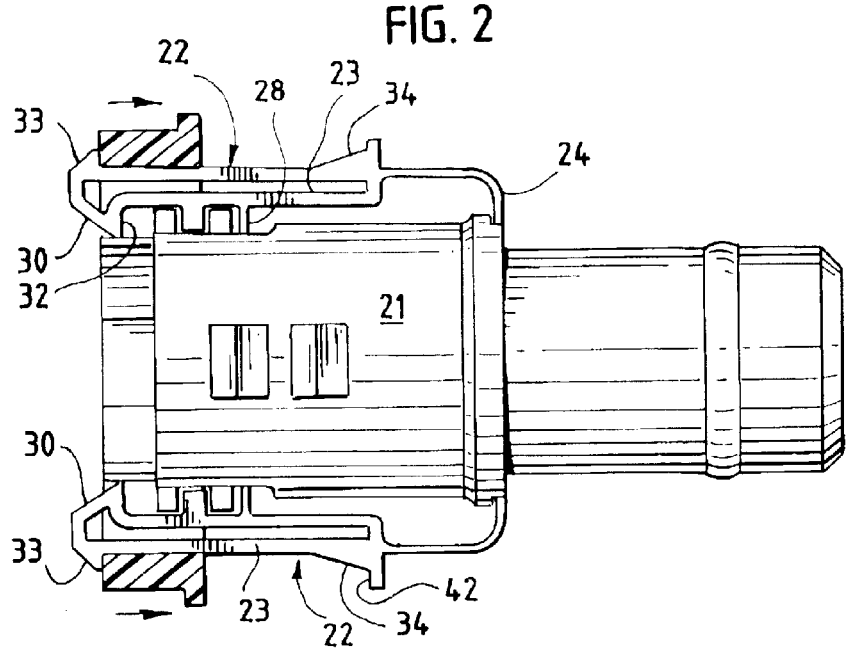
FIG. 2 is a side view of the component illustrated in FIG. 1, in partial cross-section, and showing the manner of assembling the parts of the connector segment.

With reference to FIGS. 1–5, one preferred embodiment of the present invention is illustrated as connector 10. In this embodiment, the connector is utilized in a fluid handling system with a first connector segment 12 terminating a first fluid flow passageway 14, and a second connector segment 16 terminating a second fluid flow passageway 18. The first connector segment 12 includes a laterally or radially extending flange 20. The second connector segment 16 includes a body portion 21 and a pair of diametrically opposed retainers 22 spaced slightly from body 21.

Each retainer 22 includes a lever 23 which extends from base end 24 to a free end 26, and is joined to the segment body 21 by a fulcrum wall or living hinge 28 at a position intermediate its ends. The free end 26 of the lever 23 is configured as a latch 30 with a lip 32 and a forward cam surface 33. Finally, each retainer 22 is provided with an outwardly facing cam surface 34 positioned along the length of the lever 23 at a point in between the fulcrum wall 28 and the base end 24.

In accordance with the preferred embodiments, connector 10 is also provided with a slide ring 35 which is positioned around the second connector segment 16 and over the two retainers 22. The slide ring 35 includes opposed channels 36 which have a size and configuration to slidingly cooperate with each of the retainer levers 23.

The slide ring 35 is assembled to the second connector segment 16 simply by pushing it over the free ends 26 of levers 23. As the ring engages the forward cam surfaces 33, the retainer levers will flex inward until the ring clears the latch shoulder 40. Once properly positioned around the second connector segment 16 and over the retainers 22, slide ring 35 can be easily moved between a first position, shown in FIG. 4, adjacent the latch shoulder 40 and a second position, shown in FIG. 3, adjacent cam shoulder 42. In the first position, the slide ring 35 prevents any laterally outward movement of latches 30, thereby locking the latches in engagement with flange 20. In the second position, the slide ring 35 engages the cam surfaces 34, thereby depressing each retainer lever 23 and moving the latches 30 outwardly away from flange 20. The slide ring 35 is held in the second position by engagement of bosses or risers 42 with the slide ring side walls 44.

In operation, the two connector segments 12 and 16 are joined by insertion of the first segment 12 into mating relation with the second segment 16. Once fully mated, a continuing force on slide ring 35 will move it off bosses 42 and to the first position shown in FIG. 3. To decouple the connector, the slide ring is simply moved to the second position where it will abut cam shoulder 42, and a continuing force applied to the ring will result in full disengagement of the two connector segments. Thus, the connector 10 may be either coupled or decoupled in a single manual manipulation.

Figure 6:
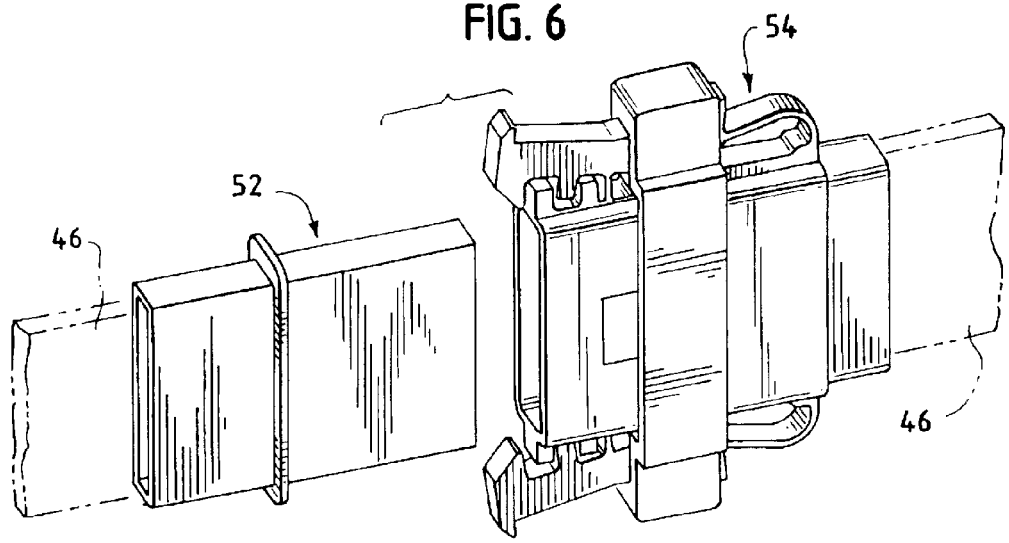
FIGS. 6 and 7 are perspective views of another embodiment of the present invention, showing the two connector segments in decoupled and fully coupled relationships.
Figure 7:
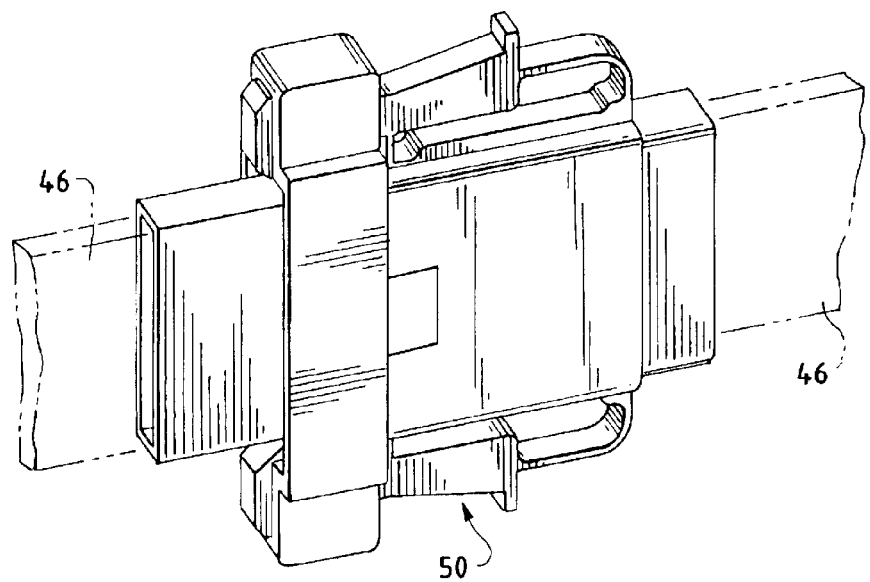

FIGS. 6 and 7 illustrate another embodiment of the invention where the connector 50 comprises two connector segments 52 and 54 employed to terminate straps or bands 46. Thus, the connector is ideally suited for use as a buckle on back packs, duffle bags, car seats and the like.

It will be appreciated by those skilled in the art that various changes and modifications can be made to the illustrated embodiments without departing from the spirit of the present invention. All such modifications and changes are intended to be covered by the appended claims.

I claim:

1. A connector, comprising:
   a first connector segment having a laterally extending flange;
   a second connector segment having a body and a pair of opposed retainers adapted to releaseably maintain the first and second connector segments in mated relationship;
   each of said retainers comprising a lever spaced laterally from the second connector segment body, the lever being joined to the second connector segment body at a base end and having a latch at a free end, the lever also being joined to the second connector segment body by a fulcrum wall positioned intermediate the ends of the lever, and the lever having an outwardly facing cam surface located between the fulcrum wall and the base end;
   a slide ring disposed over the second connector segment retainers, the slide ring being moveable from a first position adjacent the latch of each retainer to a second position of engagement with the cam surface of each retainer;
   the latch of each retainer being engageable with the flange of the first connector segment to prevent uncoupling of the first and second connector segments; and
   the latches of each retainer being locked in engagement with the first connector segment flange when the slide ring is in the first position, and the latches of each retainer being disengaged from the first connector segment flange to thereby permit uncoupling of the first and second connector segments when the slide ring is in the second position.

2. The connector of claim 1 wherein each retainer includes a latch shoulder and a cam surface shoulder, the two shoulders acting to limit the movement of the slide ring.

3. The connector of claim 1 wherein the first connector segment is a plug which terminates a first fluid passageway, and the second connector segment is a socket which terminates a second fluid passageway.

4. The connector of claim 1 wherein each retainer includes a forward cam surface at its free end which engages the slide ring thereby moving the latches laterally inward to facilitate assembly of the slide ring onto the second connector segment.

* * * * *